United States Patent
Poo

(10) Patent No.: US 7,205,976 B2
(45) Date of Patent: Apr. 17, 2007

(54) COMPUTER INPUT DEVICE CONTAINING A POINTING MECHANISM AND NON-VOLATILE SOLID STATE STORAGE MEANS

(75) Inventor: Teng Pin Poo, Singapore (SG)

(73) Assignee: Trek 2000 International Ltd, Singapore (SG)

( * ) Notice: Subject to any disclaimer, the term of this patent is extended or adjusted under 35 U.S.C. 154(b) by 278 days.

(21) Appl. No.: 10/433,540

(22) PCT Filed: Dec. 4, 2000

(86) PCT No.: PCT/SG00/00195

§ 371 (c)(1),
(2), (4) Date: Jul. 10, 2003

(87) PCT Pub. No.: WO02/46904

PCT Pub. Date: Jun. 13, 2002

(65) Prior Publication Data

US 2004/0119686 A1    Jun. 24, 2004

(51) Int. Cl.
*G09G 5/00* (2006.01)
(52) U.S. Cl. .......................... 345/156; 710/73
(58) Field of Classification Search ........ 345/156–157, 345/163; 711/103, 115; 710/73–74
See application file for complete search history.

(56) References Cited

U.S. PATENT DOCUMENTS

| | | | |
|---|---|---|---|
| 5,457,480 A * | 10/1995 | White ...................... | 345/163 |
| 5,490,096 A | 2/1996 | Seto | |
| 5,574,480 A * | 11/1996 | Pranger et al. ............ | 345/166 |
| 5,583,538 A | 12/1996 | Watanabe et al. | |
| 5,646,646 A | 7/1997 | Inoue et al. | |
| 6,137,479 A * | 10/2000 | Olsen et al. .............. | 345/169 |

(Continued)

FOREIGN PATENT DOCUMENTS

EP    0 073 544 B1    3/1983

(Continued)

OTHER PUBLICATIONS

Paolo Pavan, et al., "Flash Memory Cells—An Overview", *Proceedings of the IEEE*, vol. 85, No. 8, aug. 1997.

(Continued)

*Primary Examiner*—Kent Chang
(74) *Attorney, Agent, or Firm*—Ostrolenk, Faber, Gerb & Soffen, LLP

(57) ABSTRACT

A computer pointing device (65) has a coupling device (1) for coupling to a computer serial bus. A primary control device (60) is coupled to the coupling device (1). A computer pointing mechanism (62) is coupled to the primary control device (60) and a data storage device (10) is coupled to the primary control device (60). The primary control device (60) controls data flow between the coupling device (1) and each of the computer pointing mechanism (62) and the data storage device (10). The data storage device (10) includes an interface device (2) coupled to the primary control device (60), a memory control device (3) and a non-volatile solid-state memory device (4). The memory control device (3) being coupled between the interface device (2) and the memory device (4) to control the flow of data from the memory device (4) to the interface device (2).

12 Claims, 5 Drawing Sheets

U.S. PATENT DOCUMENTS

| | | |
|---|---|---|
| 6,154,788 A | 11/2000 | Robinson et al. |
| 6,211,861 B1 * | 4/2001 | Rosenberg et al. ......... 345/163 |
| 6,285,354 B1 * | 9/2001 | Revis ......................... 345/163 |
| 6,366,877 B1 | 4/2002 | Nishino et al. |
| 6,392,632 B1 * | 5/2002 | Lee ............................ 345/158 |
| 6,829,672 B1 * | 12/2004 | Deng et al. ................. 711/103 |

FOREIGN PATENT DOCUMENTS

| | | |
|---|---|---|
| EP | 0703544 | 3/1996 |
| KR | 2000-54496 | 9/2000 |
| WO | WO 98/15086 | 4/1998 |
| WO | WO 99/10834 | 3/1999 |

OTHER PUBLICATIONS

International Search Report

* cited by examiner

COMPUTER INPUT DEVICE CONTAINING A POINTING MECHANISM AND NON-VOLATILE SOLID STATE STORAGE MEANS

BACKGROUND OF THE INVENTION

The invention relates to a computer pointing device.

Conventional computer pointing devices generally perform only one function. That is, to enable a user to point to data or information, select an action or perform commands on a computer by interacting with a display device also connected to the computer.

In addition, there is now a number of different devices that also require to be connected to the computer such as external memory drives and other peripherals. Therefore, it is becoming necessary to have more and more connections for the various peripheral items.

SUMMARY OF THE INVENTION

In accordance with the present invention, there is provided a computer pointing device comprising a coupling device for coupling to a computer serial bus, a primary control device coupled to the coupling device, a computer pointing mechanism coupled to the primary control device and a data storage device coupled to the primary control device, the primary control device controlling data flow between the coupling device and each of the computer pointing mechanism and the data storage device; the data storage device comprising an interface device coupled to the primary control device, a memory control device and a non-volatile solid-state memory device, the memory control device being coupled between the interface device and the memory device to control the flow of data from the memory device to interface device.

An advantage of the invention is that by providing a computer pointing device including a data storage device, the computer pointing device can be used as both a computer pointing device and a data storage device. In addition, there is also the advantage that, as the data storage device comprises a non-volatile solid-state memory device, it is possible to provide a data storage device which may be coupled to a computer having a serial bus port and which does not include moving parts or require a mechanical drive mechanism to read the data from the data storage device.

Preferably, the data storage device is located wholly within a housing of the computer pointing device, and is typically, not removable from the computer pointing device.

Preferably, the data storage device receives and outputs data in the same format as the computer serial bus to which the computer pointing device is intended to be coupled.

Preferably, the computer pointing mechanism comprises a conventional computer mouse mechanism.

Preferably, the non-volatile solid-state memory device is a read/write memory device, such as a flash memory device or an electrically erasable programmable read only memory device (EEPROM).

Preferably, where the memory device is a read/write memory device, the memory control device controls the flow of data to and from the memory device.

Typically, the computer pointing device further comprises a manually operated switch movable between a first position in which writing of data to the memory device is enabled, and a second position in which writing of data to the memory device is prevented.

Preferably, the memory control device may include a read only memory, that stores a program to control the operation of the memory control device. Preferably, the memory control device is a micro-controller.

Typically, the interface device comprises a universal serial bus (USB) driver to convert data between a USB format and a PC format, and the coupling device comprises a USB coupling device.

Alternatively, the interface device comprises a driver for IEEE 1394 FIREWIRE) protocol, and the coupling device comprises a FIREWIRE (IEEE 1394) coupling device.

An example of a computer pointing device in accordance with the invention will now be described with reference to the accompanying drawings, in which:

DETAILED DESCRIPTION OF THE INVENTION

Figure 1:
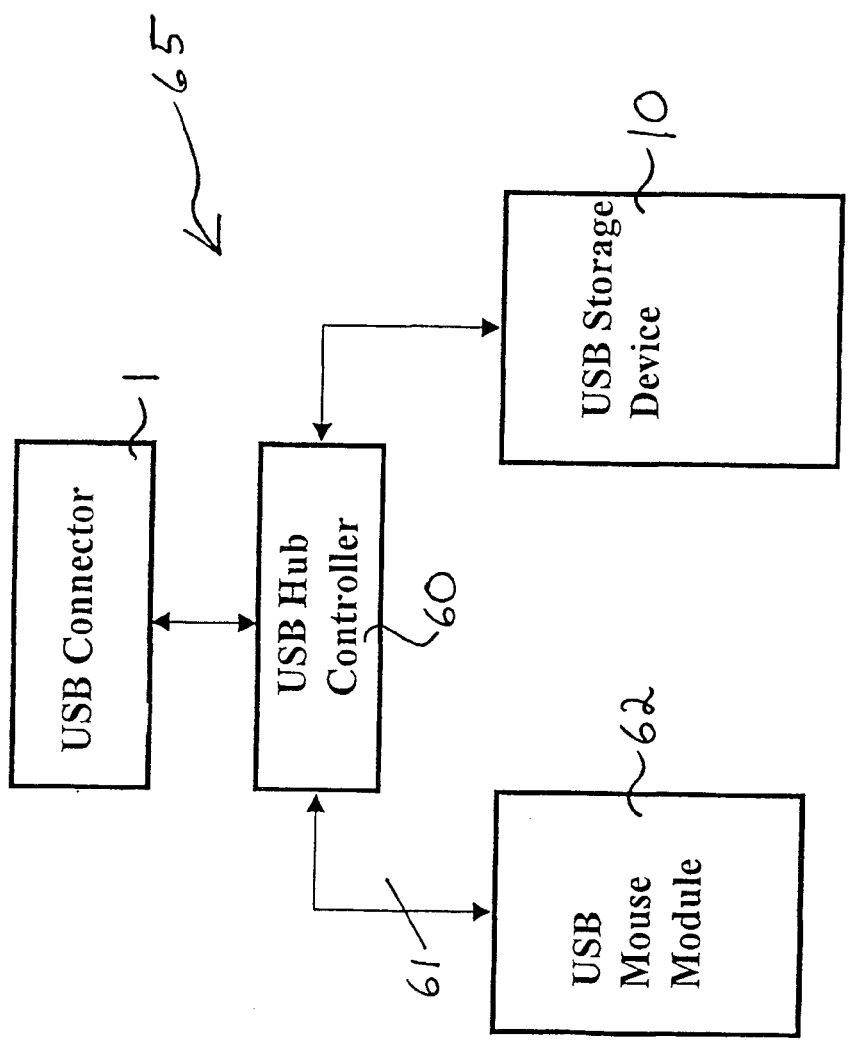
FIG. 1 is a block diagram of a computer pointing device including a data storage device.

FIG. 1 is a block diagram showing a computer mouse 65. The mouse 65 includes a USB connector 1 that is coupled to a USB hub controller 60. The USB hub controller 60 is also coupled to an output 61 from a conventional computer mouse mechanism 62 and to a data storage device 10 that is mounted within the housing of the mouse 65. Hence, the external appearance of the mouse 65 is similar or identical to a conventional computer mouse.

Figure 2:
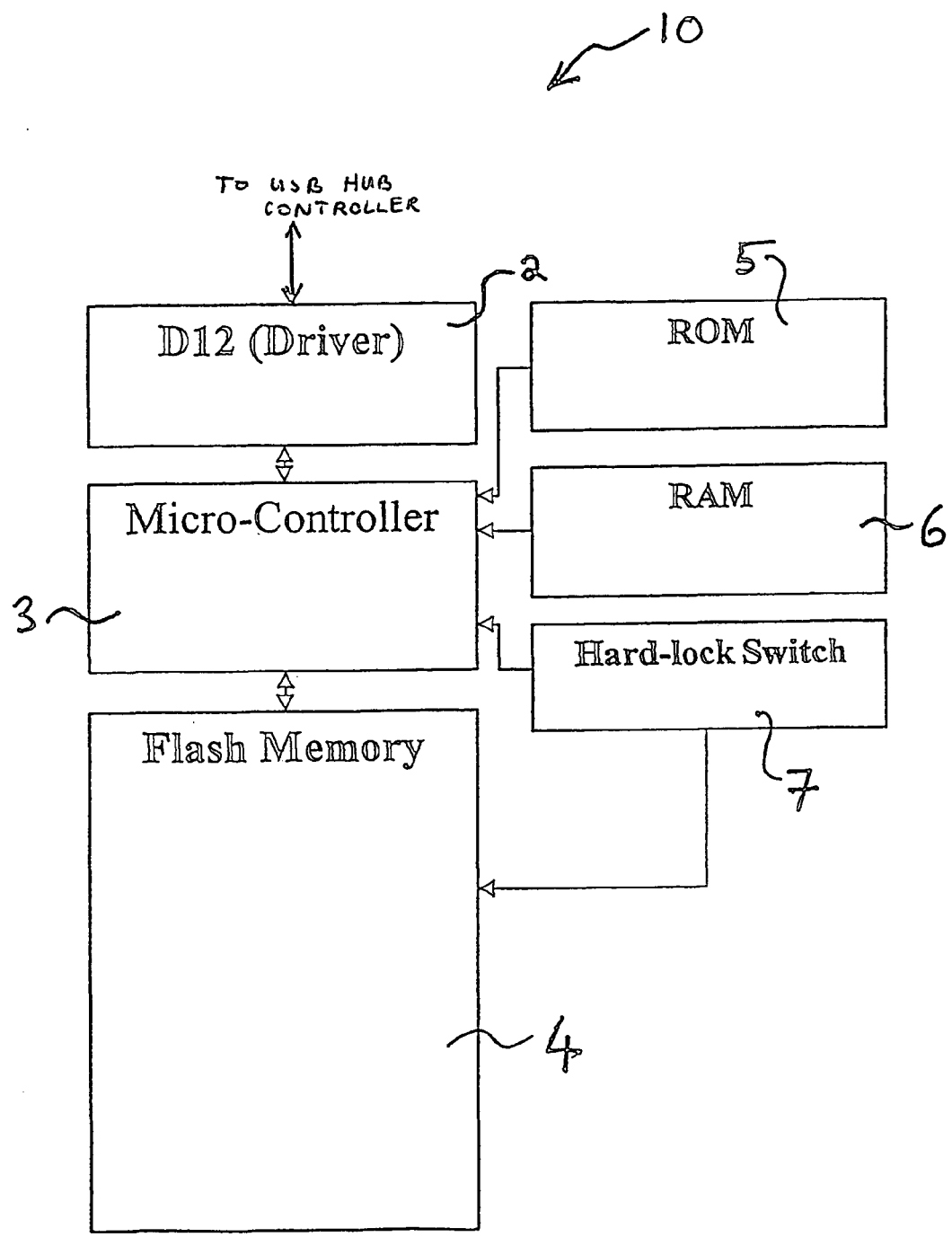
FIG. 2 is a schematic block diagram of the data storage device.

FIG. 2 shows in more detail the data storage device 10 that is coupled to the USB hub controller 60. The data storage device 10 comprises a USB interface device 2 that is coupled to the USB hub controller 60. The USB interface device 2 is also coupled to a micro-controller 3 that is coupled to a flash memory 4. The micro-controller 3 includes a read only memory (ROM) 5 that stores a program to control the operation of the micro-controller 3.

The operations performed by the micro-controller 3 include comparing passwords entered by a user with a corresponding password stored in the flash memory 4 to determine whether the user is authorised to access the contents of the flash memory 4. The program stored in the ROM 5 also controls the data flow to and from the flash memory 4 and can also detect whether the computer to which the memory device 1 is coupled has installed software programs that correspond to passwords stored in the flash memory 4. The micro-controller 3 can automatically retrieve passwords from the installed software to compare with passwords stored in the flash memory to verify that a user of the computer is authorised to access and run the software. In addition, the program stored in the ROM 5 also permits the setting of a password in the flash memory by a software supplier to correspond to the password contained in software supplied to a user. Typically, the password may correspond to the serial number of the software.

The flash memory 4 is typically divided into a number of different sections or zones. Typically, the flash memory is divided into two zones and each zone has a unique password. If the data storage device 10 is supplied with packaged software, the software serial number can be set in one zone to be the password to permit a user to access and use the software. The other zone, which can be used typically for storing a user's data, may have a separate password that is set by the user. Typically, the passwords are stored in a secure location of the flash memory in an encrypted form. The encryption, decryption, data flow control and USB protocol are all managed by the micro-controller 3.

The micro-controller 3 also includes a random access memory (RAM) 6 which is a temporary storage area to permit functioning of the micro-controller 3. In addition, a manual switch 7 is coupled between the flash memory 4 and the micro-controller 3. The manual switch 7 is located on the external surface of the mouse 65 and is movable between a first position, in which a user may write data to the flash memory 4, and a second position, in which data is prevented from being written to the flash memory 4.

The mouse 65 may also include a USB socket (not shown) that is coupled directly to the USB connector 1 and permits other USB devices to be coupled to the USB via the mouse 65. For example, if a user wishes to increase memory space, a USB connector of a second memory device 10 may be connected to the USB socket.

Figure 3:
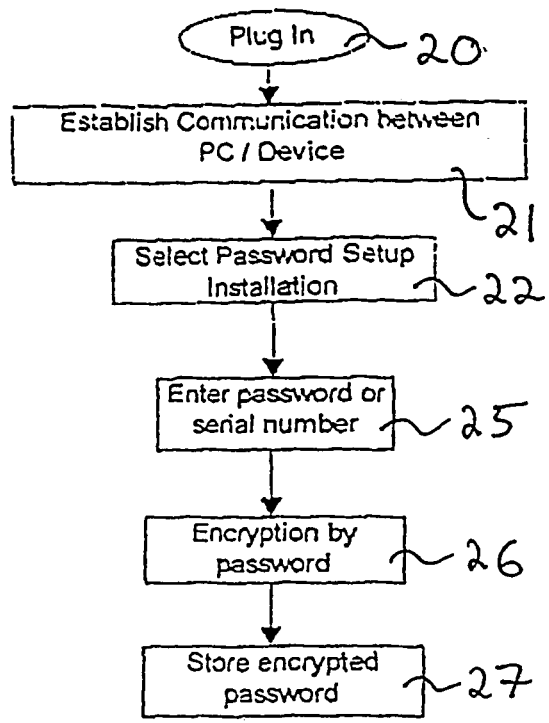
FIG. 3 is a flow diagram showing the initial setup of the data storage device by a software supplier.

FIG. 3 is a flow diagram showing the set up procedure for the device 10 for a software supplier when the software supplier intends to supply the mouse 65 as an authentication device for the software. Firstly, the connector 1 is plugged into 20 a USB socket on a computer. After the mouse 65 has been plugged into the USB socket on the computer, a communication is established 21 between the computer and the device 10. The software supplier has pre-installed installation software on the computer which is run by the operator. From the pre-installed software, the operator selects password set up installation 22, in response to which the pre-installed software requests the operator to enter a password or serial number 25 corresponding to the software with which the device 10 is to be supplied. The password or serial number is then encrypted 26 and stored 27 in the flash memory 4.

Figure 4:
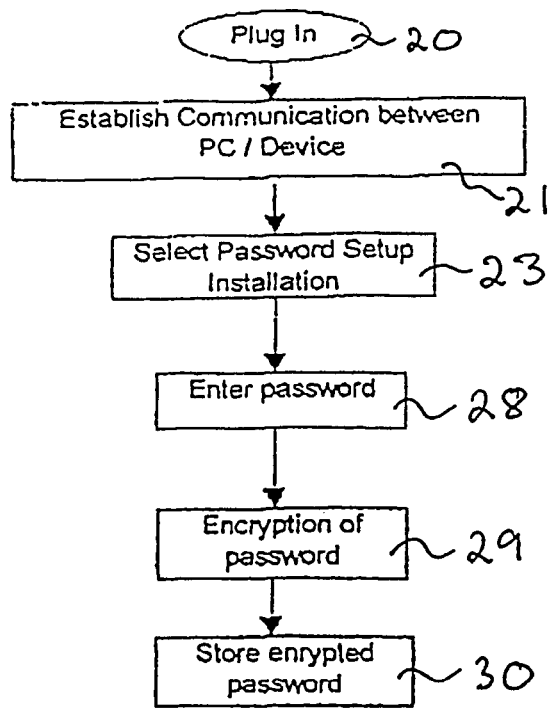
FIG. 4 is a flow diagram showing the initial setup of the data storage device by an end user.

FIG. 4 is a flow diagram showing the initial set-up of a password for zone 2 of the flash memory 4 by an end user. The mouse 65 is typically supplied with driver software for the device 10 that is loaded by the user onto the computer prior to set-up of the device 10. To set-up the password for zone 2 the user plugs in 20 the mouse 65 into a USB port on the computer and communication 21 is established between the computer and the device 10. The user then runs the driver software and the driver software enters a password installation set-up mode 23 for zone 2. The user then enters 28 a password that they wish to use to prevent unauthorised access to zone 2 of the flash memory 4. The password entered is then encrypted 29 and stored 30 in the flash memory 4.

Figure 5:
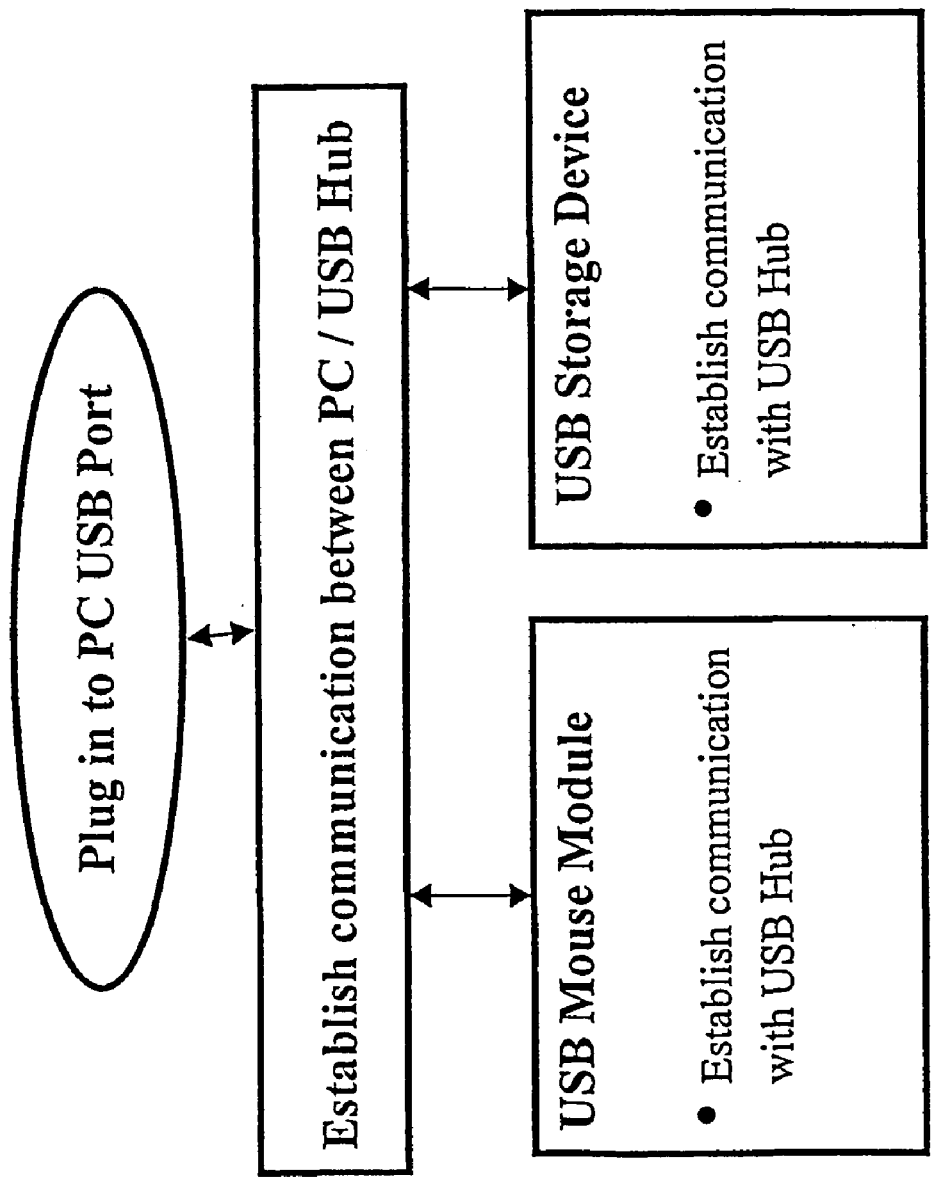
FIG. 5 is a flow diagram illustrating the operation of the computer pointing device.
Figure 6:
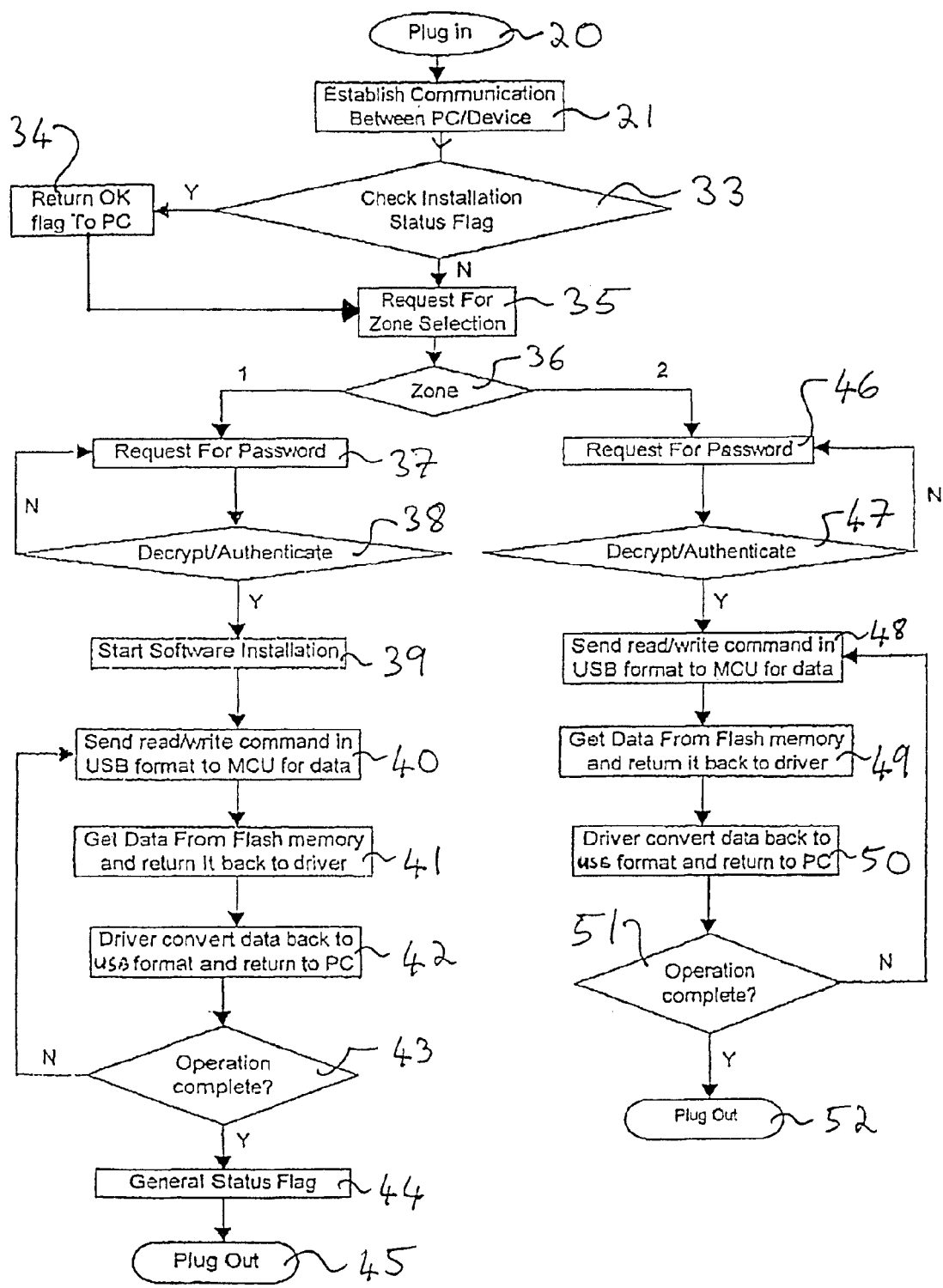
FIG. 6 is a flow diagram showing operation of the data storage device.

After an end user has performed the initial password set up procedure described above and shown in FIG. 4, when a user plugs in 20 the mouse 65 to a USB port on a computer, the computer will establish a communication 21 with the mouse mechanism 62 and the device 10, as shown in FIG. 5. When the communication with the device 10 is established, the computer first checks 33 an installation status flag stored in the flash memory 4 (see FIG. 6). If the status flag is "Y", the device 10 outputs 34 an "OK" flag to the computer. The micro-controller 3 then instructs the computer to issue a request 35 to the user to select the zone that they wish to enter. If the status flag is "N", the device does not output an "OK" flag to the computer, and goes straight to step 35. In response to the request 35 for zone selection, the user selects 36 either zone 1 or zone 2.

If zone 1 is selected, the device 10 assumes that the user wishes to install software on the computer that is stored in the flash memory 4 and requests 37 the appropriate password for confirmation that the user is authorised to install the software. The micro-controller 3 receives the password entered by the user, retrieves the zone 1 password stored in the flash memory 4, decrypts the zone 1 password and compares it with the password entered by the user to authenticate 38 whether the user is authorised to install the software. If the passwords do not match, the device 10 prompts the computer to request 37 the user to enter the password again.

If the password entered by the user matches the password stored in the flash memory 4, the micro-controller 3 starts 39 the software installation from the flash memory 4 to the computer. In order to install software, the computer sends 40 a read/write command in USB format to the micro-controller 3 for data, the micro-controller 3 retrieves the requested data from the flash memory 4, converts the data to a PC format compatible with the operating system of the computer. For example, this may be FAT 16 or FAT 32 format. The micro-controller 3 then sends 41 the data to the interface device 2. The device 2 converts 42 the data to USB format and outputs the data to the computer through the USB hub controller 60 and connector 1. The micro-controller 3 then checks 43 whether the software installation is complete. If the operation is not complete, the operation returns to step 40. If the installation of the software is complete, the status flag stored in the flash memory 4 is changed to "Y" 44. The user then plugs out 45 the mouse 65 from the USB port on the computer.

If a user selects zone 2, the micro-controller 3 sends a command to the computer to request 46 the user to enter the password for zone 2. When the user enters the password, the computer sends the password to the micro-controller 3. The micro-controller 3 retrieves the password for zone 2 from the flash memory 4, decrypts 47 the password and compares it with the password entered by the user. If the password entered by the user is incorrect, the operation returns to step 46 and the computer requests 46 the user for the password again.

If the password entered by the user is correct, the user has access to zone 2 of the flash memory 4 to read data from the flash memory 4 and to write data to the flash memory 4. However, data can only be written to the flash memory 4 if the manual switch 7 is in the position to permit data to be written to the flash memory 4. In order to read or write data from or to the flash memory 4 a read or write command is sent 48 by the computer using USB protocol to the micro-controller 3. In response to a read command the micro-controller 3 retrieves 49 data from the flash memory 4, converts the data to a PC format compatible with the computer operating system, such as FAT 16 or FAT 32. The micro-controller then sends the data to the interface device 2 for conversion 50 to USB format and then output to the computer. In response to write command, the micro-controller receives data from the interface device 2 to write to the flash memory 4.

The micro-controller 3 then determines 51 whether the read or write operation is complete. If the operation is not complete it returns to step 48. If the operation is complete the operation terminates 52.

While the computer is reading/writing to the data storage device 10, the mouse 65 can be used as a conventional computer mouse by a user and the USB hub controller 60 acts as a multiplexer to control task switching between the mouse mechanism 62 and the data storage device 10.

The mouse 65 described above is for coupling to a universal serial bus (USB). However, the connector 1, the USB hub controller 60, the interface device 2 and socket 8 could be for use with any suitable computer serial bus. For example, the device 10 could be modified for use with IEEE 1394 (FIREWIRE) protocol by substituting the USB connector 1, USB hub controller 60, USB interface device 2 and USB socket 8 with a FIREWIRE (IEEE 1394) protocol compatible plug, hub controller, interface device and socket respectively.

An advantage of the mouse 65 described above is that it combines a computer pointing mechanism with a data storage device. This is especially useful with a laptop, notebook or other portable computer where the number of serial ports, and especially USB ports, is limited. In addition the mouse 65 by its very nature is portable and the data storage device does not require a mechanically operated reading/writing device.

The invention claimed is:

1. A computer pointing device comprising
a coupling device for coupling to a computer serial bus, a primary control device coupled to the coupling device, a computer pointing mechanism coupled to the primary control device and a data storage device coupled directly to the primary control device, the primary control device controlling data flow between the coupling device and each of the computer pointing mechanism and the data storage device; the data storage device comprising an interface device coupled to the primary control device, a memory control device and a non-volatile solid-state memory device, the memory control device being coupled between the interface device and the memory device to control the flow of data between the memory device and the interface device, wherein the computer pointing device is arranged, upon receiving a write command from a computer, to store data received from the computer in the non-volatile memory, and upon receiving a read command from the computer, to convert data stored in the non-volatile memory to a format which is compatible with an operating system of the computer before transmitting the converted data to the computer.

2. A device according to claim 1, wherein the data storage device is located wholly within a housing of the computer pointing device.

3. A device according to claim 1, wherein the data storage device is not removable from the computer pointing device.

4. A device according to claim 1, wherein the data storage device receives and outputs data in the same format as the computer serial bus to which the computer pointing device is to be coupled.

5. A device according to claim 1, wherein the computer pointing mechanism is a computer mouse mechanism.

6. A device according to claim 1, wherein the non-volatile solid-state memory device is a read/write memory device.

7. A device according to claim 6, wherein the read/write memory device is a flash memory device.

8. A device according to claim 6, wherein the memory control device controls the flow of data to and from the memory device.

9. A device according to claim 1, further comprising a manually operated switch movable between a first position in which writing of data to the memory device is enabled, and a second position in which writing of data to the memory device is prevented.

10. A device according to claim 1, wherein the memory control device comprises a micro-controller.

11. A device according to claim 1, wherein the coupling device comprises a universal serial bus (USB) coupling device and the interface device comprises a USB driver.

12. A device according to claim 1, wherein the coupling device comprises an IEEE 1394 (FIREWIRE) protocol coupling device and the interface device is a FIREWIRE protocol driver.

* * * * *